June 24, 1930.  J. W. HAZELL  1,768,359
MEANS FOR MAKING MOLDS
Filed Dec. 31, 1926   4 Sheets-Sheet 1
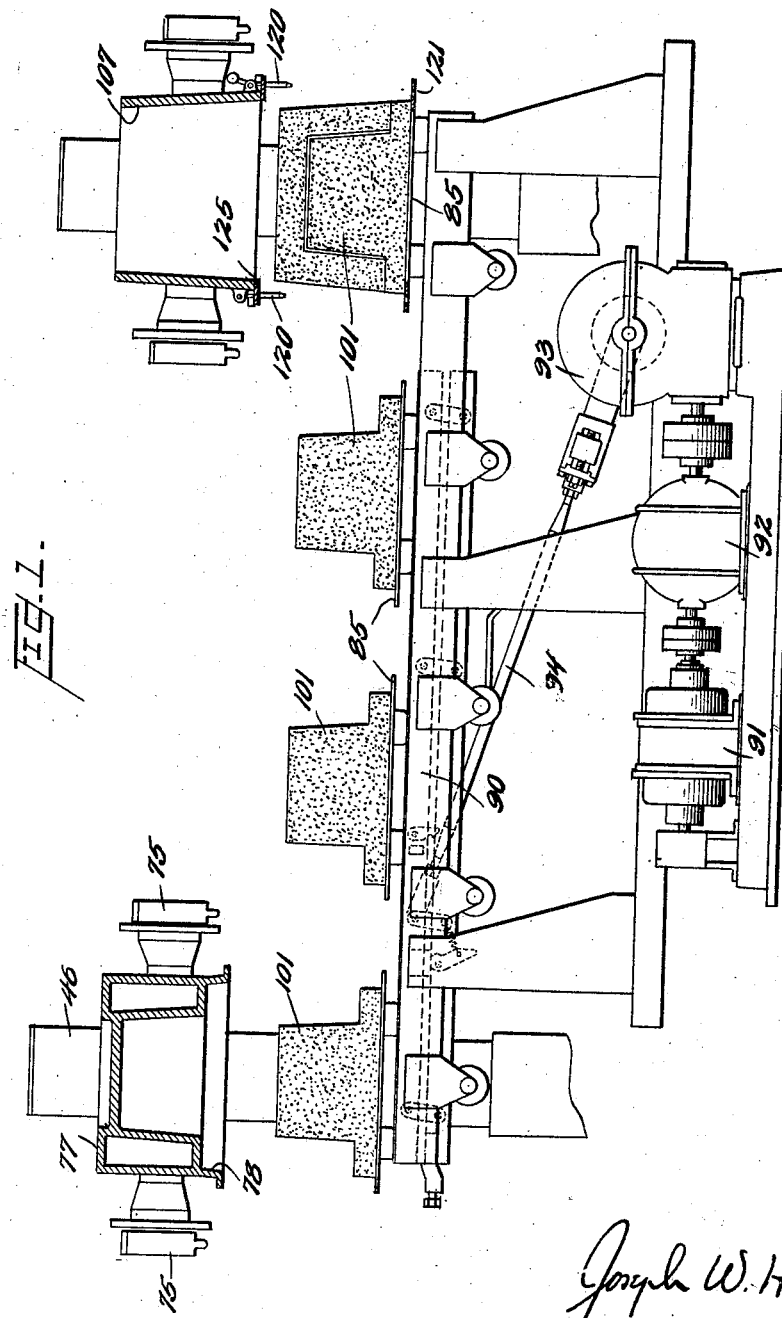
Inventor
Joseph W. Hazell

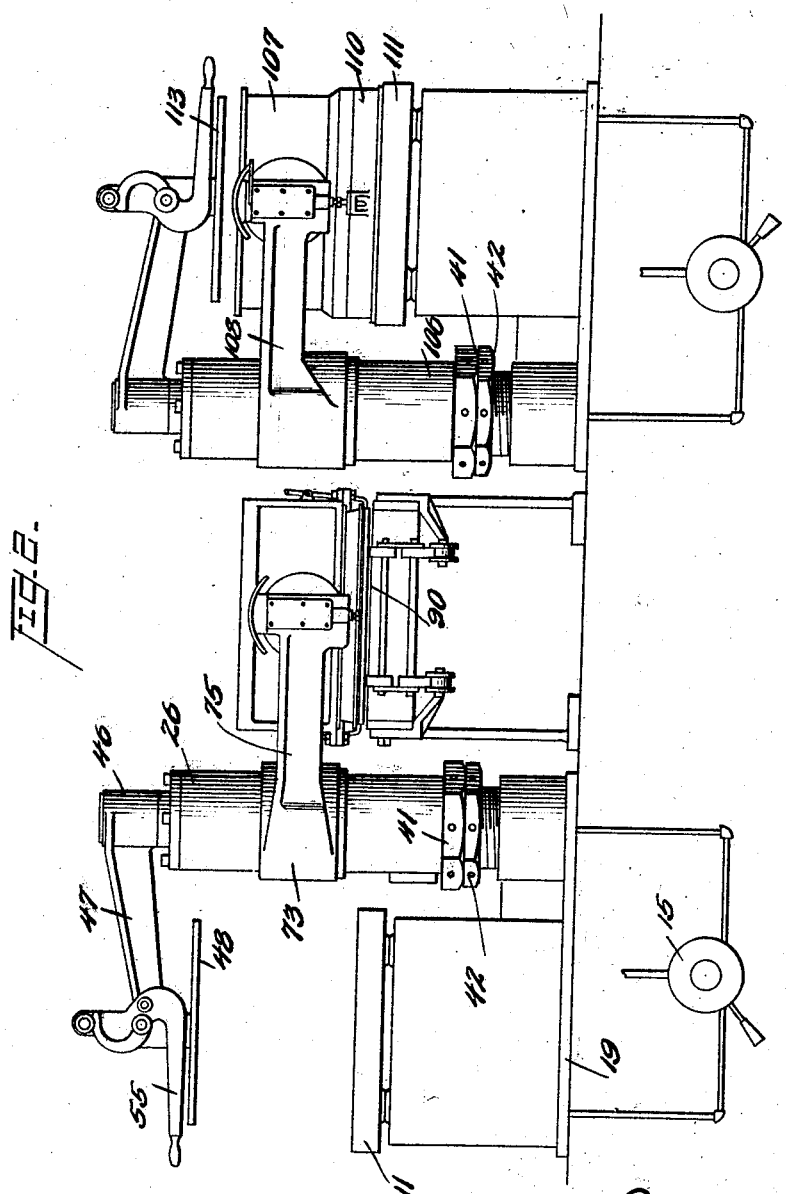

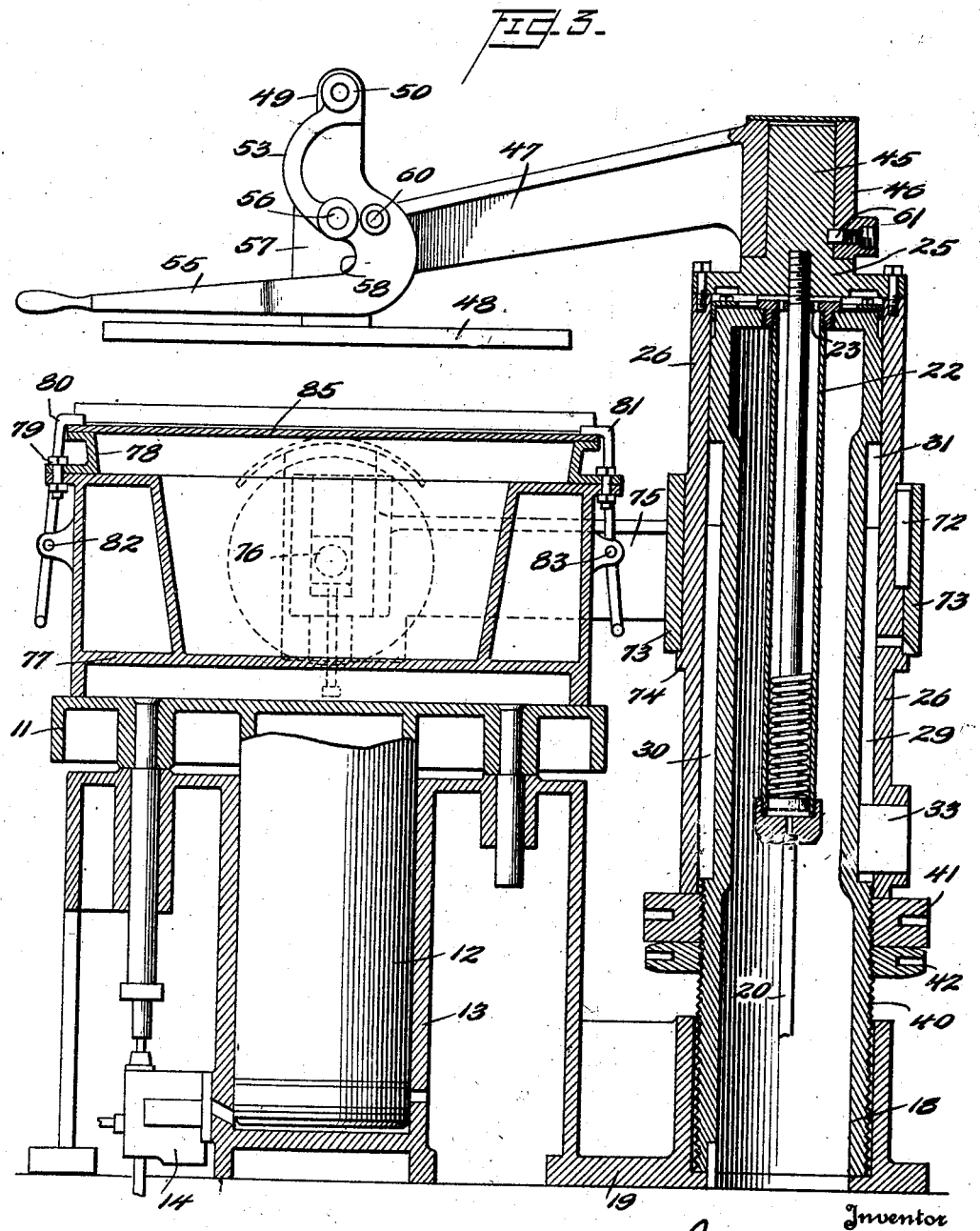

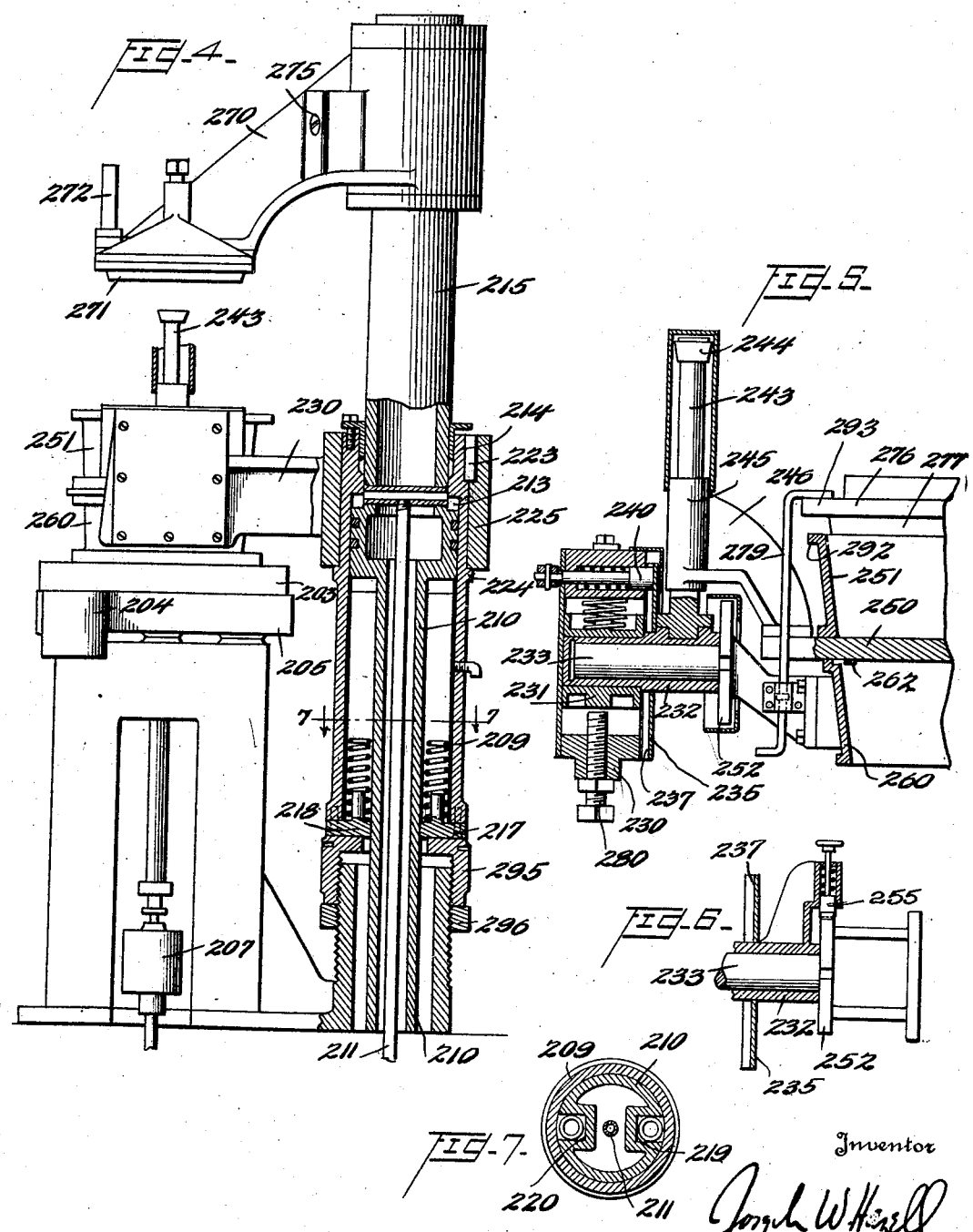

Patented June 24, 1930

1,768,359

UNITED STATES PATENT OFFICE

JOSEPH W. HAZELL, OF WASHINGTON, DISTRICT OF COLUMBIA, ASSIGNOR TO NEW PROCESS MULTI-CASTINGS COMPANY, A CORPORATION OF NEW JERSEY

MEANS FOR MAKING MOLDS

Application filed December 31, 1926. Serial No. 158,265.

The present invention relates to foundry molding machines and to methods of making molds for castings.

An object of the invention is to provide a molding machine having the cope and drag flask parts permanently attached to the machine during the production of any given number of complete molds ready for pouring.

Another object of the invention is to provide a molding machine provided with packing means and also with pattern drawing means and with means for stripping the cope and drag from the mold.

A further object of the invention is to provide a method of producing a continuous supply of complete molds ready for pouring.

Other objects and advantages of the invention will appear from the following description taken in connection with the accompanying drawings, in which are illustrated, by way of example, preferred embodiments of the apparatus of the invention, but which are not to be taken as a definition of the limits thereof, reference being had to the appended claims for that purpose.

In the drawings:

Fig. 1 is an elevation of a complete double machine including mold assembly and mold transfer means;

Fig. 2 is a side elevation of a slightly different form thereof;

Fig. 3 is an enlarged sectional elevation of the machine of the left-hand part of Figs. 1 and 2;

Fig. 4 is a side elevation, partly in section, of a single machine;

Fig. 5 is an enlarged sectional detail view showing the flask attaching mechanism of Fig. 4;

Fig. 6 is a detail plan view, partly in section, of the flask locking mechanism of Fig. 5;

Fig. 7 is a horizontal sectional view through the stationary piston of Fig. 4.

Referring in detail to the drawings, the general molding machine apparatus of Figs. 1 and 2 may be of any preferred form. As illustrated, and referring particularly to Figs. 2 and 3, the drag forming part of the machine includes a drag mold jarring table 11 provided with any suitable form of piston and cylinder table jarring means such as the piston 12 and cylinder 13, which may be governed by any suitable form of automatic jarring valve 14 controlled by the manually operated valve 15.

A stationary piston 18 is fixed in the base 19 of the machine and is provided with a pipe line 20, by means of which air is introduced into the depending hollow cylinder 22, from which it passes through openings 23 into the expansible chamber between the end of the piston 18 and the head 25 of the rotatable and vertically movable cylinder 26. The piston 18 is shown as being provided with oppositely arranged, exterior, longitudinally extending grooves 29 and 30 connected at their tops by a semicircular passage 31, in which grooves and passage the inwardly extending key or guide lug 33 of the cylinder 26 is adapted to travel. The guide lug 33, as the cylinder moves upwardly, travels upwardly in the groove 29 until it reaches the semicircular passage 31, around which it is adapted to travel while the cylinder is in raised position until it comes over the guide groove 30. The cylinder by this time having made half a revolution on its vertical axis is then lowered, being guided in its downward movement by the guide lug 33 of the cylinder traveling downwardly in the guide groove 30 of the piston.

Adjustable stop or abutment means are provided for the lower end of the cylinder 26 so that its lowermost position may be predetermined and fixed throughout the production of a number of molds, and, by way of illustration, one such means is shown in Fig. 3 and includes the exterior threaded portion 40 on the cylinder, with which cooperates an upper interiorly threaded abutment plate or nut 41 locked in position by any suitable means such as the lock nut 42. The cylinder 26 in its lowermost position is adapted to rest upon the top surface of the abutment member 41.

The head 25 of the cylinder 26, which is fixed to the end of said cylinder, is herein shown as having the upwardly extending cylindrical projection 45, which rotatably receives the sleeve portion 46 of packing member arm 47, which carries at its outer end the vertically movable packing plate 48 secured to a short vertically movable but non-rotatable shaft 49 carrying at its upper end one or more rollers 50 adapted to ride on the cam portion 53 of cam lever 55, which is pivotally mounted at 56 to the vertical sleeve 57 fixed at the outer end of arm 47. The packing plate 48 is at times adapted to be raised to upper position as shown in Fig. 3.

The cam lever 55 is lowered about the pivot 56, causing the rollers 50 to ride on the cam 53 to the position shown in the drawings, and thereby lifting the shaft 49 and packing plate 48 to raised position. The packing plate 48 is at other times adapted to be lowered down upon the sand, for example during jarring thereof, and rest upon the sand during the jarring movement, being free to move vertically during this operation, at which time the lever 55 is moved about its pivot 56 to approximately vertical position so that the cam roller 50 rides down the cam 53 toward the pocket 58, the lever 55 being held in either raised or lowered position by a spring-pressed detent 60 adapted to enter either of two locking depressions, one for the raised and the other for the lowered position of said lever. A spring-pressed positioning detent 61 in the sleeve 46 of the arm 47 is adapted to enter one or more depressions in the cylindrical member 45 for the purpose of positioning the arm 47 over the sand to be packed.

Fixed by a key 72 to the cylinder 26 is a flask arm sleeve 73, which rests upon a shoulder 74 of said cylinder and carries a pair of horizontally extending parallel arms 75, which support for vertical and rotatable movement in their outer ends a pair of trunnions 76 extending toward each other and supporting between them a drag pattern 77 adapted to rest upon the top of the table 11.

Secured upon the drag pattern 77 is the drag member 78 of the flask, which is shown as being bolted at 79 or otherwise rigidly secured to the drag pattern. A pair of bottom board retaining hooks 80 and 81 are shown as being pivoted at 82 and 83 to the pattern 77 for the purpose of retaining upon the drag 78 a bottom board 85 after the sand has been packed in the drag and the drag pattern.

The operation of the structure of Fig. 3 is as follows: With the parts in the inverted position of Fig. 3, but with the bottom board 85 removed and the packing plate arm 47 swung aside, sand is introduced into the pattern 77 and drag 78, a frame being used to increase the height of the walls of the drag temporarily to hold the sand extending above the drag. The packing plate arm 47 is then swung around to the position of Fig. 3, being accurately positioned by the detent 61, and the lever 55 is raised, thus lowering the packing plate 48 down upon the top of the sand. The valve 15 is then actuated to cause jarring movement of the table 11, during which operation the drag mold sand is packed not only by the jarring effect of the table, but also by the packing effect of the packing plate 48. The lever 55 is then lowered to the position of Fig. 3, raising the packing plate 48 off the sand, the temporary frame, if one has been used, is removed, surplus sand struck off and the bottom board 85 placed in position in the usual manner, where it is retained by the hooks 81. Valve 15 is then actuated to admit air through the pipe line 20 into the space between the cylinder 26 and piston 18 for the purpose of raising the cylinder on the piston, at which time the drag pattern and flask assembly is rolled over to upright position. When the guide lug 33 reaches the semicircular passage 31, the cylinder and drag assembly may be rotated in a horizontal plane to bring the drag assembly over an assembly or assembly and transfer table, upon which the drag parts are lowered. The retaining hooks 81 are thereupon released from the bottom board 85, and the cylinder 26 is again raised, thereby drawing the pattern and at the same time stripping the drag flask from the mold, and leaving the stripped drag mold resting on the bottom board on the assembly table. It is to be observed that in this operation the drag is always deposited in a predetermined position, owing to the guide lug 33 traveling downwardly in groove 30.

A suitable form of assembly and transfer table is shown at 90 in Figs. 1 and 2 and may comprise any suitable form of movable mold transporting means, said mechanism having an automatic step-by-step longitudinal movement, for which purpose it may be provided with any suitable driving mechanism, such as that shown in the drawings, comprising a motor 91, reduction gears 92 and a worm driven crank arm 93 for actuating the connecting rod 94 pivotally connected at its other end to the movable mold rest or transfer table.

In Fig. 1 the cope mold forming mechanism is illustrated as being on the same side of the transfer table as the drag mold forming mechanism, but spaced away therefrom a sufficient distance to allow the series of drag molds produced by the drag mold forming machine and intermittently moving toward said cope mold forming machine, to be inspected or to permit cores to be set in the drag molds 101.

In Fig. 2 the cope mold forming apparatus is shown as being located on the other side of the assembly table 90 which may be either a movable or stationary table, from the drag mold forming apparatus.

The cope mold forming part of the machine is constructed substantially the same as the drag apparatus already described and is provided with the stop collars 41 and 42 for the cope cylinder 106. The cope 107 is supported for vertical and rotatable movement in the outer ends of the arms 108, fastened as before to the cylinder. The cope 107 is adapted to rest on the cope pattern 110 secured on the cope jarring table 111.

The cope is provided with the necessary sand retaining slides for the purpose of retaining sand in the cope when the cope pattern 110 is drawn by raising the cylinder 106, at which time, of course, the cope packing plate 113 has been swung aside. The completed cope is brought over the assembly table 90 and is lowered down upon the stripped drag mold, being accurately guided in this downward movement by a guiding lug and grooves similar to the lug 33 and guide grooves 29 and 30 of Fig. 3.

It is essential that the cope mold be deposited on the drag mold not only accurately but without defacing or marring said drag mold. The aforesaid guiding lug insures the accurate downward movement of the cope mold; and the stop plate or collar 41, properly adjusted, insures that the downward movement of the cope will cease at the precise moment the mold is completely closed, the cylinder 106 coming to rest on said stop collar at this moment. Where, as in Fig. 1, the cope part of the machine is spaced some distance away from the drag mold forming machine, additional positioning means may be provided, such as the downwardly extending positioning pins 120 secured in the cope 107, which positioning pins, tapered at their lower ends, are adapted to enter cooperating positioning openings 121 provided in each of the bottom boards 85.

When the cope mold has been deposited on the drag mold, the sand retaining slides 125 are released in the usual manner and the cope is lifted by raising cylinder 106, thus leaving the mold closed and stripped on the bottom board. A temporary pouring or slip-over jacket may then be placed upon the mold during the pouring operation. Meanwhile, with the same drag, another drag mold has been prepared, said drag mold being usable for this purpose the moment the drag mold has been deposited on the table. By this construction only one drag and only one cope are necessary for the production of any number of molds; the drag is stripped from the drag mold at the same time the drag pattern is drawn, and the same drag is, without any loss of time, immediately available for the production of another drag mold. The same is true of the cope parts.

The drag 78 may be formed integrally with the drag pattern 77, as shown in Fig. 1, or may be formed separately and bolted or otherwise secured thereto, as shown in Fig. 3.

Referring to the machine of Fig. 4, in which the cope and drag are carried on the same arms, an operating table top 203 is pivoted at 204 upon a jarring table 205, from which it is adapted to swing out in a horizontal plane about its pivot. An automatic jarring valve 207 is preferably provided and may be operated by any suitable form of control valve which also may control the raising and lowering cylinder 209 mounted to slide vertically on the stationary piston 210, which is provided with the pipe line 211 leading from any suitable source of air under pressure through said piston and into the expansible chamber 213 between the top of the piston and the cylinder head 214. The piston may be extended upwardly, as shown at 215, to form a bearing guide for the cylinder 209, which at its lower end is provided with the end plate 217 fixed thereto and provided with opposed, inwardly extending lugs 218 adapted to ride in opposed grooved portions 219 and 220 provided in the exterior face of the hollow stationary piston 210 for the purpose of guiding the cylinder in straight line vertical movement.

Keyed to the cylinder 209, as at 223, and resting on a shoulder 224 of said cylinder, is a sleeve member 225 carrying the substantially parallel and horizontally extending flask supporting arms 230.

The arms 230 are provided at their outer ends with vertical guide bearings in which slide the guide blocks 231, and revolubly mounted within each of said guide blocks is a rotatable sleeve 232, within which is rotatably mounted a trunnion member 233. The sleeve 232 is provided with a disc 235 fixed thereto, in the face of which are located oppositely extending radial grooves 237, in one or the other of which, depending upon whether the flask as a whole is in upright or inverted position, is located a spring-pressed detent 240, which guides the flask in straight line vertical movement during jarring of the flask with its trunnions 233 and guide blocks 231, which slide up and down in the outer ends of the arms 230.

Fixed to the sleeve 232 is the radially extending guide rod 243 provided with an enlarged tapered end 244, upon which a sleeve 245 is adapted to abut in one of its end positions on said rod 243. The sleeve 245 is rotatably, as well as slidably, mounted on the rod 243 and is provided with a bracket portion 246, to the outer end of which is fixed a pattern plate 250, to which is fixed the drag portion 251 of the flask.

The trunnion 233 is provided with a locking disc 252 fixed thereto which has locking notches provided in its circumference for the reception of a spring-pressed detent 255. Said detent locks the cope part of the flask to the remaining part of the assembly and is also adapted at times to release said cope therefrom so that said cope may be rotated 90° to permit of inspection of its interior when the flask parts are separated.

The cope 260 is fixed by a bracket to the trunnion 233, and is also provided with any suitable form of sand retaining slide 262.

To the upper end of the stationary piston portion 215 is rotatably secured the squeeze head arm 270 carrying at its outer end, in fixed relation thereto, a squeeze plate 271, which, as shown, may have a downwardly extending tapered portion adapted to enter the cope when the cope mold sand is being packed, and the cope sand is forced against said squeeze plate 271. The squeeze plate arm 270 is preferably provided at its outer end with any convenient form of handle 272, by means of which it may be swung aside or brought over the flask, in either of which positions it may be locked by any suitable form of spring-pressed detent 275.

The operation of the device of Figs. 4 to 7 inclusive is as follows: With the flask parts assembled in the position of Fig. 4, but with the squeeze plate 271 swung aside or away from its position over the flask parts, the open drag 251 is filled with molding sand, whereupon the table 205 is jarred to pack the sand in the drag. The surplus sand is struck off in the usual manner and a bottom board 276, having a tapered flask entering portion 277 (see Fig. 5), is fixed on the drag by bottom board hooks 279 in position to be forced into said drag upon the application of pressure thereto. During the jarring movement the flask parts are jarred vertically upon the table and move vertically in the outer ends of the arms 230. After jarring, the cylinder 209 is raised, lifting upwardly the flask parts, which at this time are supported on adjustable abutment screws 280 located in said arms. The detent 240 is now released and the entire flask assembly, including trunnion 233 and sleeve 232, is rotated through 180°, in which position the parts are locked by the detent 240, which enters the other radial locking groove 237.

With the flask parts in upright position, sand is introduced into the cope and the surplus sand is struck off without jarring. The table 205 is now actuated by compressed air not to jar but to lift the flask against the squeeze plate 271, the flask carrying upwardly with it, by the arms 230, the cylinder 209, which has a sufficiently long bearing on the piston to insure smooth vertical movement. The lifting movement continues until the squeeze plate 271 contacts with the top surface of the sand in the cope, and the movement continues sufficiently further so that the squeeze plate 271 is forced to enter the cope for a short distance to compress the sand therein, and the tapered portion 277 of the bottom board is forced upwardly into the drag 251, so that the drag flange 292 abuts against the edge 293 of said bottom board. The table is now brought to lowered position, the hooks 279 released, and the cylinder 209 is raised, thereby lifting the trunnions 233 and sleeves 232. In this movement the bottom board, drag and pattern plate remain resting on the table top 203, and the cope and cope mold only are lifted, the squeeze plate arm 270 being swung aside for clearance. The detent 255 may now be released, and the cope and cope mold may be rotated 90° to bring the interior of the cope mold into view for inspection. With the cope returned to vertical position, the upward movement may be continued, if it has not already been carried far enough, so that the rod 243 carried by sleeve 232 moves upwardly until the end 244 of the rod abuts the sleeve 245. Further upward movement will carry the sleeve 245 upwardly with said rod, and since the pattern plate 250 and drag 251 are fixed with respect to the sleeve 245, the pattern will be drawn and the drag mold stripped by this upward movement. When the drag is clear of the drag mold, the drag and pattern plate may be rotated about the rod 243, which revolubly supports the sleeve 245, the drag and pattern plate, after which the cylinder 209 may be lowered to bring down the cope mold and close the mold.

It is important that this closing of the mold take place, first, so that the mold parts will be accurately assembled and, secondly, so that there will be no jarring or defacing of the drag mold. The lugs 218 accomplish the necessary guiding and positioning of the cope; and an adjustable stop collar 295, with which cooperates a locking collar 296, stops the descent of the cylinder 209 at the precise moment when the sand parts come together, so that there will be no jarring effect on the drag mold. With the sand slides 262 released, the cylinder 209 may be again lifted to strip the cope from the cope mold, after which the assembled and stripped mold may be removed from the machine and provided with a slip-over pouring jacket for pouring of the casting metal.

It is to be observed that only one cope and only one drag are required for the production of any desired number of molds; and that the drag part of the flask, as well as the cope and pattern, is attached to and forms a part of the machine. The drag flask is stripped from its mold during the same movement in which the pattern is drawn.

Either of the two machines herein illustrated is adapted to perform the method of the present invention, though it will be obvious that other types of machines may be modified or adapted to carry out said method. In the method of the present invention the drag is stripped before the mold is closed; in machines of the type of Figs. 1 and 2, a number of drags are eliminated which would otherwise necessarily have to remain on their molds until the molds are closed; in the type of the machine illustrated in Fig. 4, the drag, as well as the cope, forms a permanent part of the machine; all movements of the flask parts are absolutely precise and it is impossible to injure a mold in stripping either the drag or the cope or in drawing the pattern; also in both types of machine the stripping of the drag and drawing of the pattern are accomplished in the same movement.

Various changes and modifications will suggest themselves and may be made without departing from the invention as defined by the appended claims.

What is claimed is:

1. A mold making apparatus including cope and drag flask parts and a pattern, means for packing sand in said flask parts to form cope and drag molds, means for drawing said pattern, means operable during the pattern drawing movement for stripping said drag mold of its drag, and operable thereafter for closing said mold.

2. A mold making apparatus including cope and drag flask parts and a pattern, means for packing sand in said flask parts to form cope and drag molds, means for drawing said pattern, means operable during the pattern drawing movement for stripping said drag mold of its drag, means for positioning said cope mold on said stripped drag, and means for stripping said cope mold of its cope.

3. A mold making machine including a drag flask and pattern, means for packing sand in said drag flask, and a pattern drawing member operable on movement in one direction to draw said pattern and strip said drag flask from its mold.

4. A mold making apparatus including a cope flask, means for packing sand in said flask to form a cope mold, a rectilinearly movable member for closing said cope mold with a stripped drag mold, guiding devices insuring correct registration of the cope mold with a stripped drag, and an adjustable abutment stop element preventing further movement of said member at the moment of contact of the two molds.

5. Mold forming apparatus including a cope mold forming machine provided with a cope and a cope handling member adapted to deposit the cope mold on a drag mold and thereafter strip said cope mold of its cope, a bottom board adapted to support a stripped drag mold, an abutment stop associated with said cope handling member for stopping mold closing movement thereof at the moment of closing the mold, and guiding devices on said cope cooperating with said bottom board for centering the cope on the stripped drag when the mold is closed.

In testimony whereof I affix my signature.

JOSEPH W. HAZELL.